Figure 5:
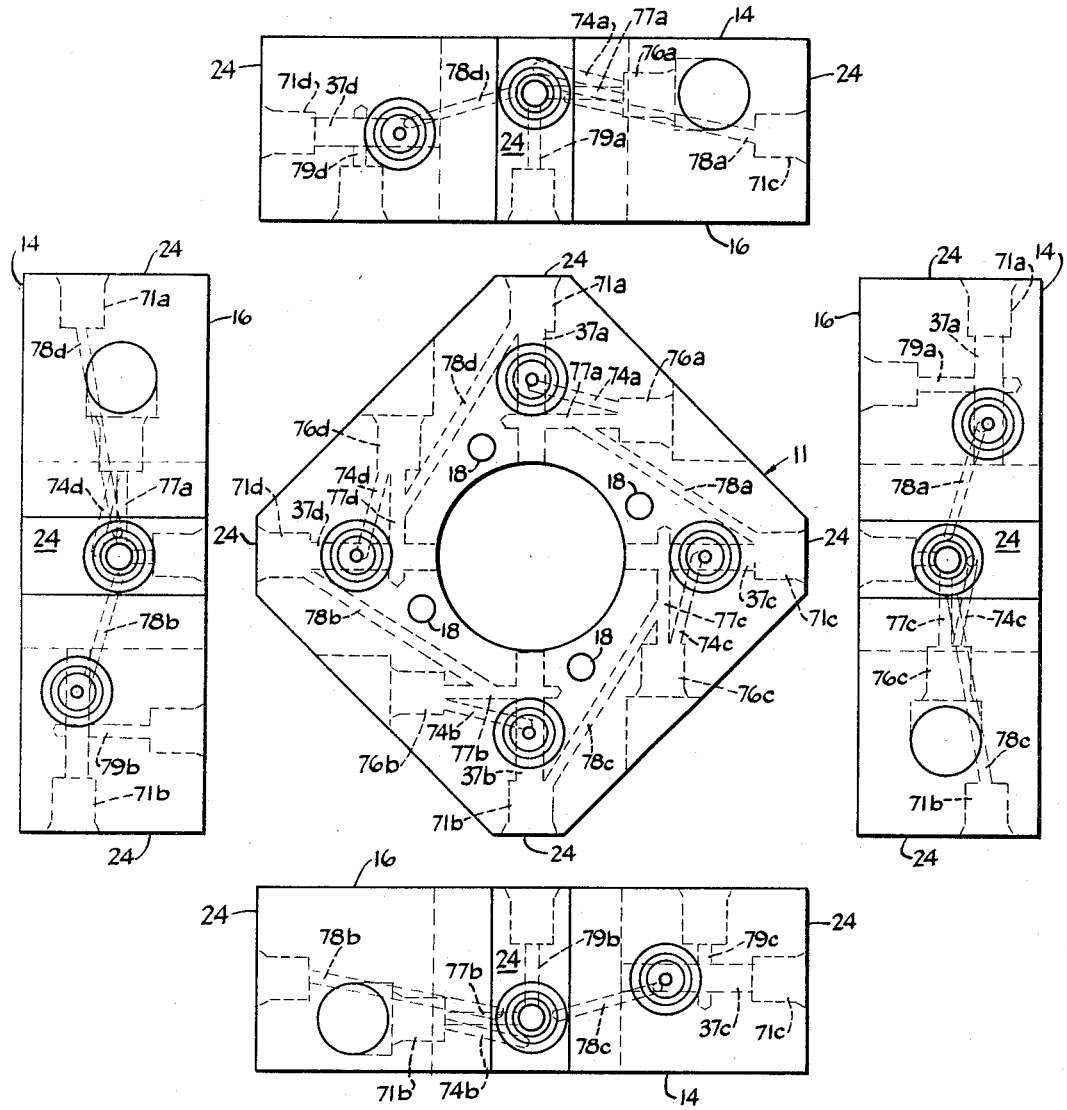

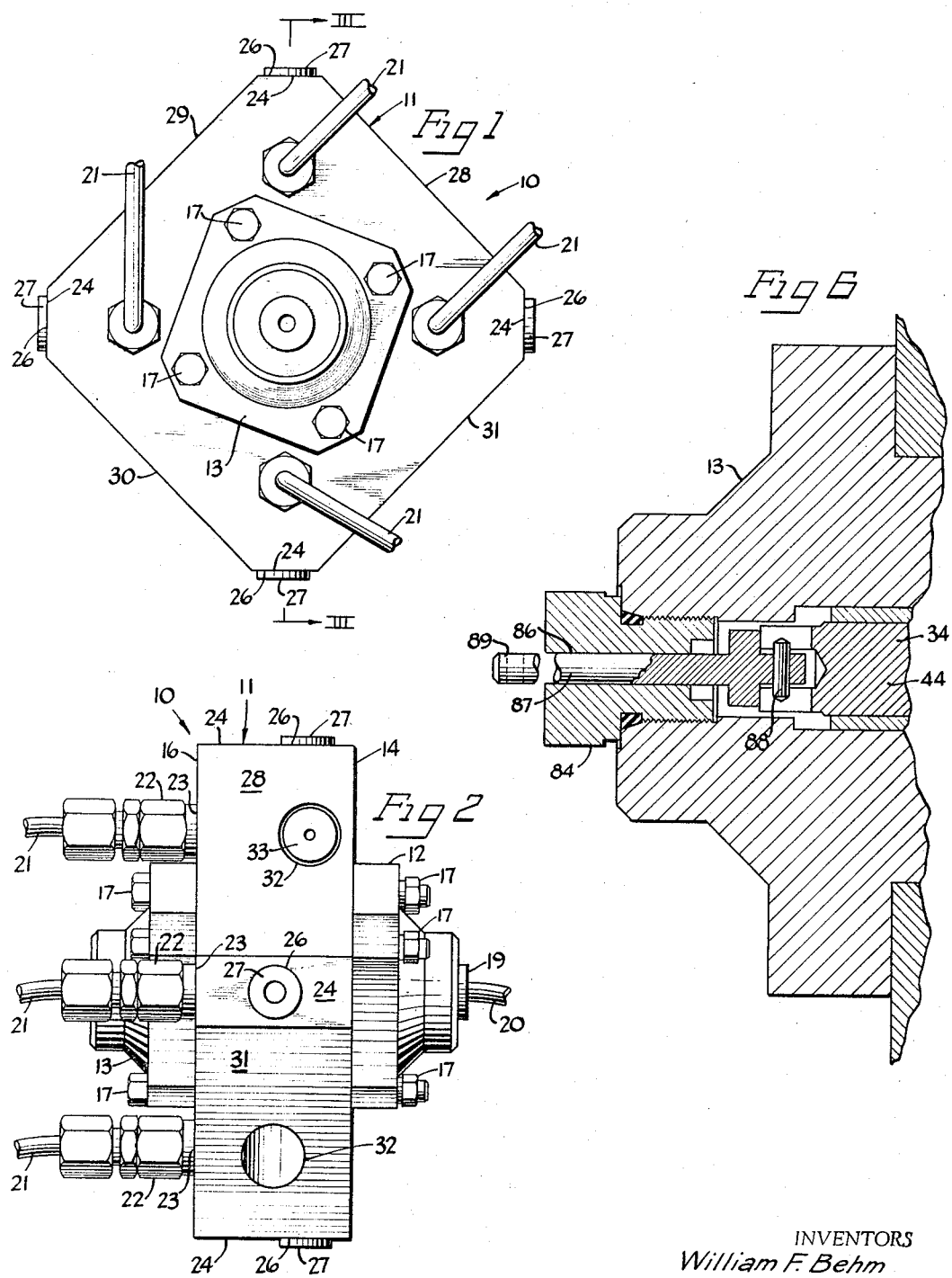

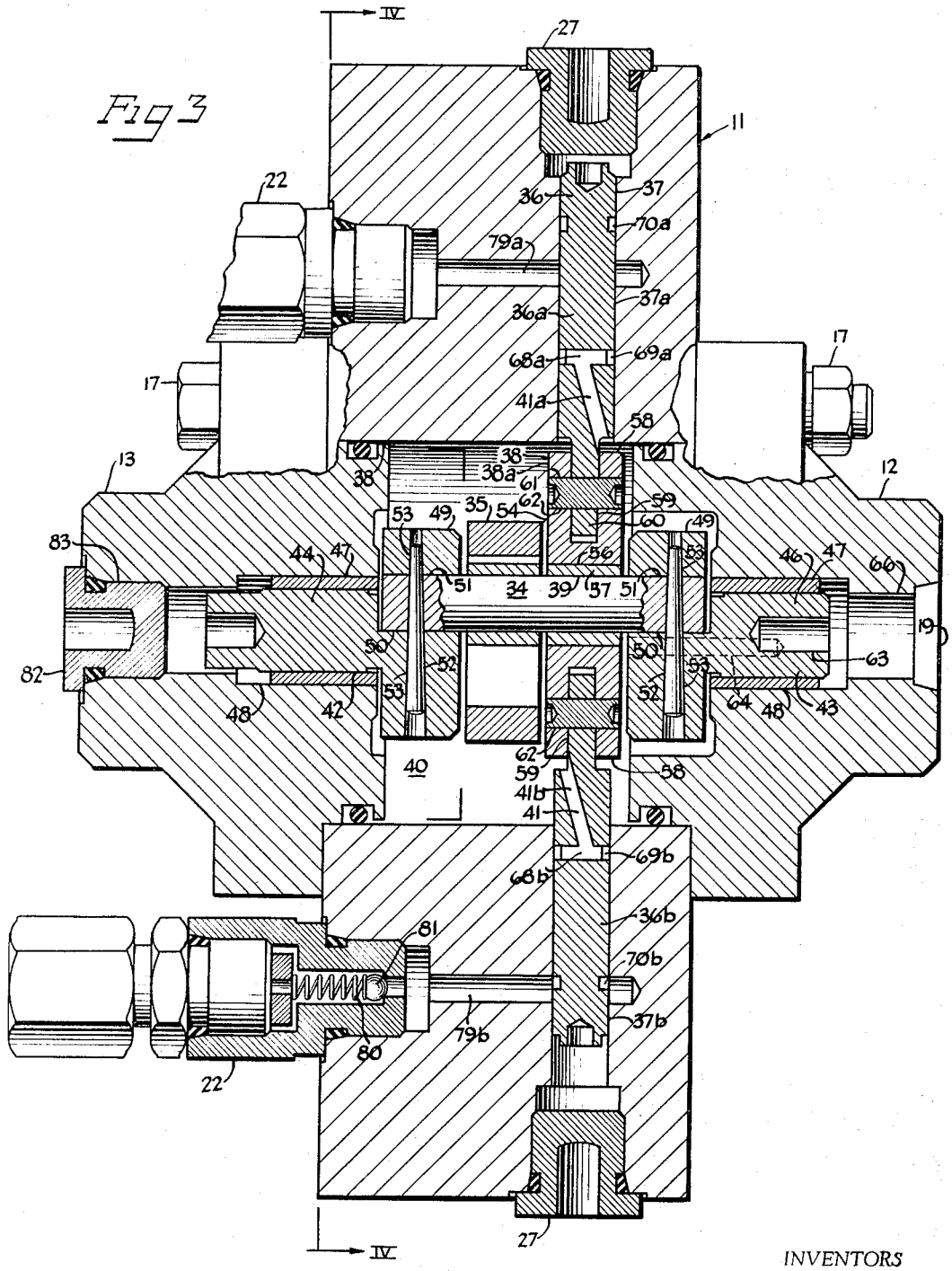

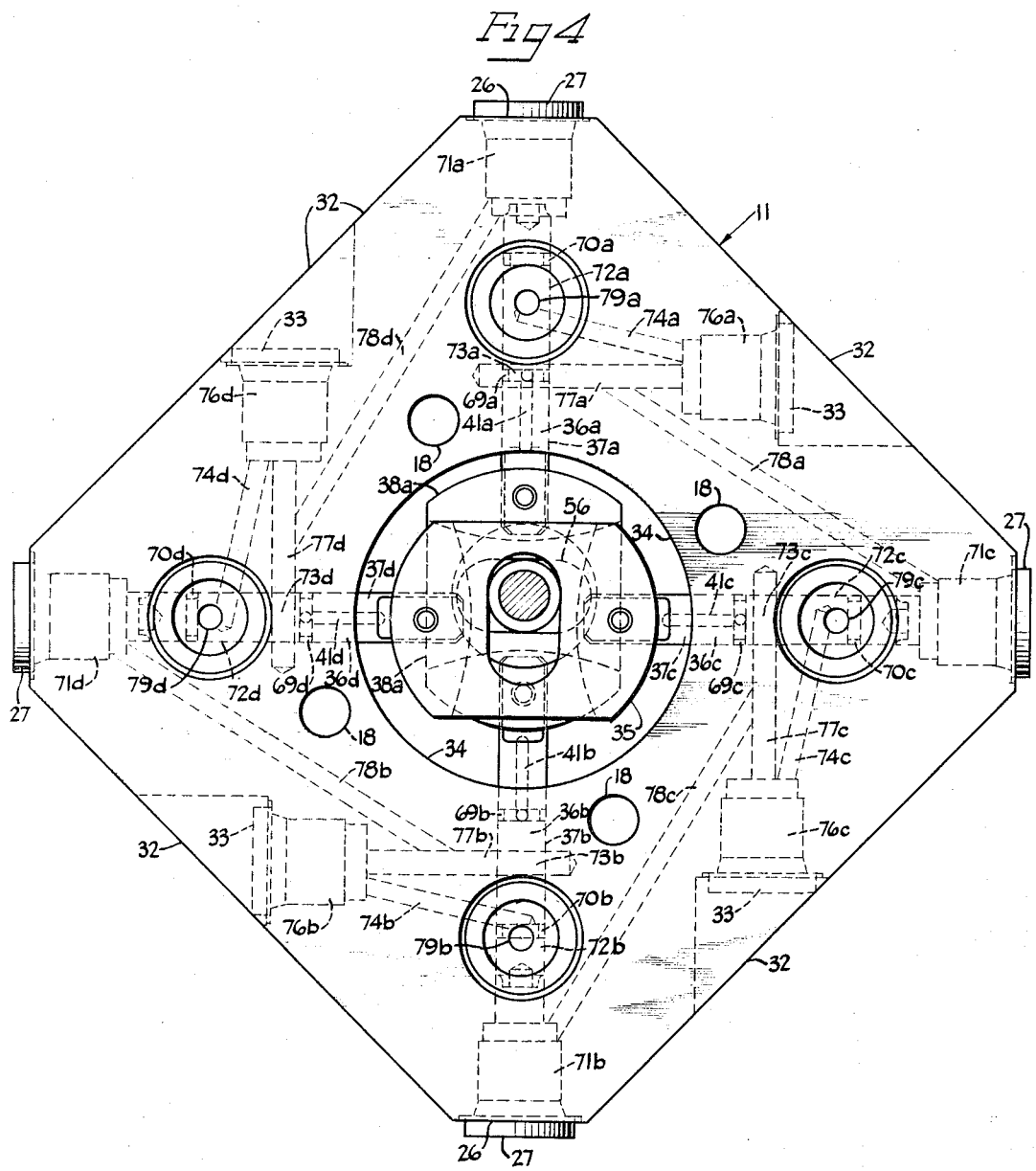

June 20, 1967 W. F. BEHM ETAL 3,326,136
FLUID FLOW CONTROL DEVICE
Filed Sept. 30, 1965 4 Sheets-Sheet 4

INVENTORS
William F. Behm
BY Sydney E. Leese
ATTORNEYS

United States Patent Office 3,326,136
Patented June 20, 1967

3,326,136
FLUID FLOW CONTROL DEVICE
William F. Behm, Cowlesville, and Sydney E. Leese, Hamburg, N.Y., assignors to Houdaille Industries, Inc., Buffalo, N.Y., a corporation of Michigan
Filed Sept. 30, 1965, Ser. No. 491,800
19 Claims. (Cl. 103—49)

This invention relates generally to fluid flow control devices and more particularly to a reciprocating flow control device for dividing the delivery of fluid from one main source through a plurality of outlets to various points of use in accurate metered proportions. The control device of the present invention comprises a plurality of reciprocating pistons or slide valves, all of which are mechanically linked to each other through a rotatable crankshaft. This interconnection of the pistons precludes the travel of any of them through less than a full stroke per revolution of crankshaft travel. All pistons must sweep their full volume or the device becomes inoperative.

A feature of the present invention provides for full stopping of the crankshaft and the attendant cessation of fluid flow through all outlets in the event of hang-up of any one of the pistons. The delivery of fluid to any point of use is, therefore, precluded unless all points of use connected to the device are receiving their full predetermined flow of fluid. Stoppage of the device can be easily monitored to a control board for safety purposes should the device cease operation for any reason.

Another feature of the present invention is the alternating motoring characteristic inherent therein which permits starting of the device at all angles of rotation of the crankshaft. Regardless of the position of the crankshaft after the device has been stopped the re-establishment of communication of pressurized fluid to the inlet of the device will cause operation thereof. Further, the motoring characteristics will preclude stoppage of the device due to minor operational impedance, such as that which small particles of dirt or tight fitting of the part would exert. It is, therefore, a principal object of the present invention to provide a fluid flow control device for dividing a pressurized flow of fluid from a central source into a plurality of predetermined lesser flows.

Another object of the present invention is to provide a fluid metering device having piston slide valve assemblies connected to a common actuating member and requiring a full stroke of each piston to sustain operation, thereby assuring a full swept volume of each piston per rotation of the actuating member.

Another object of the invention is to provide a fluid flow control device having valve means connected in out-of-phase relation to the actuating member or crankshaft and disposed to assure starting of the device upon delivery of pressurized fluid thereto, thereby avoiding all dead spots, regardless of the angular disposition of the crankshaft when it comes to rest.

Another object of the present invention is to provide a flow control device having inherent motoring characteristics, for preventing stoppage of the device due to minor operational impedances exerted thereon due to dirt particles, tight fitting parts and the like.

Another object of the present invention is to provide a device for accurately dividing and metering fluids into a plurality of predetermined equal or unequal parts.

Yet another object of the present invention is to provide a flow control device wherein the valve means for determination of the fluid flow are formed integrally with the pistons, thereby assuring correct out-of-phase relation between all of the pistons and the valve means.

Another object of the invention is to provide a flow control device having oppositely disposed reciprocating pistons arranged in axially spaced cylinder banks and interconnected to a crankshaft by means of mutually associated yokes having transversely arranged driving slots for receiving the crank of the crankshaft, thereby transmitting straight line forces to and from the pistons to reduce side loading of the pistons.

Another object of the present invention is to provide a piston actuated flow control device wherein a plurality of pistons are connected to a common crankshaft and arranged in mutually out-of-phase relation relative to the crankshaft such that more than one piston is continually in driving relation to the crankshaft during an entire revolution of the crankshaft except during four quadrant transition periods, but during these periods at least one piston is applying its maximum torque to the crankshaft.

Another object of the present invention is to provide a flow control device wherein all fluid communicating passageways of the device are defined by the housing of the device.

Other objects and advantages will be fully apparent from a description of the accompanying drawings.

On the drawings:
FIGURE 1 is an elevational front view of a fluid control device of the present invention;
FIGURE 2 is an elevational end view of the device of FIGURE 1;
FIGURE 3 is an elevational sectional view taken substantially along line III—III of FIGURE 1 with parts removed;
FIGURE 4 is an elevational sectional view taken substantially along the line IV—IV of FIGURE 3, illustrating the relative arrangement of the crankshaft, the pistons, the yoke connecting means, the inlet and outlets and the passageways of the device of the present invention illustrating essentially diametrically the relative arrangement of fluid passageway;
FIGURE 5 illustrates the housing 11 with some parts removed in a front view, a top view, a bottom view and right and left hand views; and
FIGURE 6 is an elevational sectional fragmentary view similar to FIGURE 3 with parts removed illustrating another embodiment of a cover cap of the present invention including a crankshaft extension.

*General arrangement*

Although the principles of the present invention are of utility in dividing and controlling the flow of any fluid a particularly useful application is made to the field of hydraulics and an illustrative embodiment of the invention herein shown has particular utility in dividing and controlling the flow of liquids.

An assembled flow control device embodying the principles of the present invention is shown generally at 10 in FIGURES 1 and 2 wherein is illustrated an essentially rectangularly shaped housing 11 having a rectangularly shaped inlet cover cap 12 and an outlet cover cap 13 securely affixed to an inlet end 14 and an outlet end 16 thereof respectively. Cover caps 12 and 13 can be secured to the housing 11 by any suitable means, and in the illustrated embodiment of the invention threaded bolts 17 are disposed marginally along the perimeter of the cover caps 12 and 13 to be received in complementarily threaded bolt holes 18 arranged similarly in the inlet and outlet ends 14 and 16 of the housing 11 (FIGURE 5).

The principle object of the present invention is to divide and control a flow of fluid emanating from a source of pressurized fluid and intended for communication to a plurality of points of use. For delivering fluid to the device an inlet port 19 opening centrally from the inlet cover cap 12 is shown connected to an inlet conduit 20 which, in operation of the device, connects at its opposite end to a source of pressurized fluid (not shown).

Extending outwardly from the outlet end 16 of the housing 11 are shown a plurality of outlet conduits 21, adapted for connection at their opposite ends to various points of use, each of the conduits 21 being connected to the housing 11 by means of a uni-directional check valve 22 threadedly connected to the housing 11 by means of similarly arranged threaded outlet ports 23.

As best illustrated in FIGURES 1 and 2 the corners of the housing 11 are formed perpendicularly to the vertical and horizontal center lines of the device to project flat surfaces 24. For providing ease in the machining and cleaning of certain internal passages in the device, as will be made clear later, each of the corner surfaces 24 defines a threaded port 26 which is sealed to prevent flow therethrough by means of a complementarily threaded plug 27 inserted therein. To further aid in machining and cleaning the internal passageways, mutually perpendicularly shaped sides 28, 29, 30 and 31 of the housing 11 define threaded ports 32 which are sealed by means of threaded plugs 33 (FIGURES 2 and 4).

In order to divide and control the flow of fluid from the pressurized source to various points of use, the flow control device of the present invention comprises a crankshaft 34 journalled for rotation in cover caps 12 and 13 and connected for the transmission of alternately driving and driven forces to a plurality of reciprocating piston slide valves, generally indicated by reference numeral 36, which are slidably carried in complementarily shaped cylinders 37 defined by the housing 11. The pistons 36 are connected for reciprocable movement to the crankshaft 34 by means of yoke assemblies shown generally at 38 (FIGURE 3). A crank 39 of the crankshaft 34 and the yoke assemblies 38 are disposed for rotation within a crankcase 40 defined by the housing 11 and the cover caps 12 and 13. The crankcase 40 is in open communication with the inlet port 19 of the inlet cover cap 12 to receive and be filled by pressurized fluid communicated to the inlet port 19 by suitable conduit means, as shown at 20 in FIGURE 2. A plurality of inlet passageways or piston channels 41 are defined by the piston 36 and are in open communication with the crankcase 40. As will be more fully explained, pressurized fluid within the crankcase 40 is communicated by means of inlet passageways 41 to additional passageways defined by the housing 11 and is regulated to periodically enter the outer portion of the cylinders 37 to force the pistons carried therein downwardly, thereby causing rotation of the crankshaft. The pistons 36 are connected to the crankshaft 34 in mutually out-of-phase relation. By out-of-phase relation is meant that each of the pistons 36, at any angle of rotation of the crankshaft, is at a different distance from a top dead center position than each of the other pistons. After each piston has been driven to its bottom dead center position by the pressurized fluid, a valve controlling the flow of fluid to the corresponding cylinder is closed, and another valve opens to communicate the cylinder through various passageways to an outlet port 23 so that when the piston travels to its top dead center position the fluid within the cylinder is driven by the piston through the outlet port to a corresponding point of use through an outlet conduit 21. It will be understood that through proper arrangement of the valves, each piston is alternately driven by pressurized fluid delivered to its corresponding cylinder to impart a rotative force to the crankshaft and is then driven by the crankshaft to drive the fluid within its cylinder to an outlet port.

The crankshaft 34 comprises a pair of similarly shaped oppositely facing collar shafts 42 and 43 having cylindrically shaped outwardly extending stub portions 44 and 46 which are carried for rotation by bearings 47 housed within complementarily shaped bores 48 which are centrally axially aligned within the cover caps 12 and 13.

Collar portions 49 of the collar shafts 42 and 43 define axially aligned bores 50 which carry end portions 51 of the crank 39 in offset relation relative to the center line of the stub portions 44 and 46 of the collar shafts 42 and 43. In the illustrated embodiment of the invention, tapered holding pins 52 are shown extending through complementarily shaped bores 53 aligned in registry with the crank 39 and the collar portions 49 to provide a firm assembly for joint movement of the entire crank and collar assembly, although it is apparent other suitable means could be used in this regard.

As best illustrated in FIGURES 3 and 4, a pair of axially spaced yoke assemblies 35 and $38_a$ are carried by the crank 39. Yoke assembly $38_a$ is illustrated comprising an axially perpendicularly extending linkage member 54 defining a driving slot 56 which extends perpendicularly relative to the section or plane of FIGURE 3 and engages in sliding relation a bearing surface 57 surrounding the crank 39. Extending inwardly from the end portions 58 of the linkage member 54 are coupling slots 59 which receive similarly shaped coupling flange portions 60 extending inwardly from pistons $36_a$ and $36_b$ which are, in turn, carried within cylinders $37_a$ and $37_b$. In order to provide a joint movement of the yoke assembly $38_a$ and pistons $36_a$ and $36_b$, connecting pins as shown at 61 are disposed within axially extending bores 62 defined by the linkage member 54 and the flange portions 60 of the pistons $36_a$ and $36_b$.

Referring to FIGURE 4, yoke assembly 35 is constructed similarly to yoke assembly $38_a$ but is angularly offset 90° on the crank 39 relative to yoke assembly $38_a$. A pair of mutually opposed pistons $36_c$ and $36_d$ are carried by cylinders $37_c$ and $37_d$ at right angles to pistons $36_a$ and $36_b$.

For communicating pressurized fluid from the inlet port 19 in the cover cap 12 to the crankcase 40, the stub portion 46 of the collar shaft 43 defines a centrally located axially extending bore 63 which is in open communication with an adjacent bore 64 disposed in slightly offset relation relative to bore 63. The cover cap 12 defines an aperture 66 which is in open communication with the inlet port 19 and the bore 63. It will be understood, therefore, that pressurized fluid entering through inlet port 19 will travel to the crankcase 40 through the aperture 66 and bores 63 and 64. Bore 64 opens into the crankcase 40 through a port 67.

Inlet passageways $41_a$ and $41_b$ which are defined within pistons $36_a$ and $36_b$ are in open communication at one end with crankcase 40 and terminate at the other end in transverse slots $68_a$ and $68_b$ which communicate with annular grooves or valves $69_a$ and $69_b$ also defined by the pistons $36_a$ and $36_b$ and extending circumferentially therearound at the perimeter thereof. A second set of circumferentially disposed annular grooves or valves $70_a$ and $70_b$ are defined by a piston $36_a$ and $36_b$ and located radially outwardly from valves $69_a$ and $69_b$.

As is best shown in FIGURE 4, pistons $36_c$ and $36_d$ define valves $69_c$ and $69_d$ in communication with inlet passageways $41_c$ and $41_d$, and valves $70_c$ and $70_d$ which are located radially outwardly from valves $69_c$ and $69_d$. The valves defined by pistons $36_c$ and $36_d$ are constructed and disposed similarly to the valves defined by pistons $36_a$ and $36_b$.

Referring again to FIGURE 4, cylinders $37_{a-d}$ comprise outer portions $71_{a-d}$, middle portions $72_{a-d}$ and inner portions $73_{a-d}$. Opening into one face of the middle portions $72_{a-d}$ are fluid passageways $74_{a-d}$ defined by the housing 11 and communicating middle portions $72_{a-d}$ respectively with hollow chambers $76_{a-d}$ defined by the housing 11 and disposed adjacent plugs 33. Opening into the inner portions $73_{a-d}$ of the cylinders $37_{a-d}$ are fluid passageways $77_{a-d}$ defined by the housing 11 and communicating inner portions $73_{a-d}$ with chambers $76_{a-d}$ respectively. Also defined by the housing 11 are fluid passageways $78_{a-d}$ communicating passageways $77_{a-d}$ with the outer portions of cylinders $37_c$, $37_b$, $37_d$ and $37_a$ respectively.

Extending inwardly from the outlet ports 23 formed in the outlet end 16 of the housing 11 in a direction parallel to the longitudinal axis of the crankshaft 39 are a plurality of outlet passageways $79_{a-d}$ communicating the outlet ports 23 with the middle portions $72_{a-d}$ of the cylinders $37_{a-d}$.

In order to properly appreciate the operation of the present invention it is necessary to fully understand the communicating relationships of the various passageways, the crankcase, the hollow chambers, the cylinders and the inlet and outlets. For the purpose of providing greater clarity in this respect, FIGURE 5 illustrates the embodiment of the housing 11 with some parts removed. A front view as well as a top view, a bottom view and right and left hand side views are shown which clearly illustrate the interrelation of all fluid communicating means.

Operation

To describe the operation of the flow control device of the present invention, it may be assumed that the inlet port 19 is connected by means of conduit 20 to a source of pressurized fluid. Referring to FIGURE 3, the fluid will pass through the bores 63 and 64 of the stub portion 46 of the collar shaft 43 and completely fill the crankcase 40 as well as inlet passages $41_{a-d}$ defined by the pistons $36_{a-d}$ opening at one end thereto.

Referring to FIGURE 4, the annular grooves or valves $69_{a-d}$ defined by pistons $36_{a-d}$ respectively are thereupon filled with pressurized fluid. The arrangement of the pistons $36_{a-d}$, as the crankshaft 34 is positioned in FIGURE 4, is such that piston $36_a$ is in a top dead center position, piston $36_b$ is in a bottom dead center position and pistons $36_c$ and $36_d$ are in a position intermediate top and bottom dead center. In this position of the crankshaft 34, fluid flow through valves $69_b$, $69_c$, and $69_d$ is prevented by their non-alignment of fluid passageways communicating with inlet passageways $41_{b-d}$. However, in the position shown, valve $69_a$ is disposed adjacent inlet passageway $41_a$ and passageway $77_a$, thereby communicating pressurized fluid from the crankcase 40 through passageway $41_a$ and valve $69_a$ to passageway $77_a$. Since passageway $74_a$ is also in communication with passageway $77_a$ through the chamber $76_a$ it will also become filled with pressurized fluid. In this position of the piston $36_a$, however, the fluid in passageway $74_a$ is prevented from flowing therethrough since passageway $74_a$ is not at this time in communication with passageway $79_a$.

Passageway $77_a$ is, however, in communication with passageway $78_a$. The pressurized fluid will, therefore, flow through passageway $78_a$ to the outer portion $71_c$ of the cylinder $37_c$. The pressure of the fluid in the outer portion $71_c$ will force the piston $36_c$ axially inwardly which will result in the rotation of the crankshaft 34 in a counterclockwise direction.

Moving simultaneously with the piston $36_c$, piston $36_d$ begins to move axially outwardly, and in the early stages of this outward movement the valve $69_d$ defined thereby will become aligned with passageway $77_d$, thereby communicating pressurized fluid from the crankcase 40 through the passageway $77_d$ and passageway $78_d$ to the outer portion $71_a$ of the cylinder $37_a$.

The pressure of the fluid in the outer portion $71_a$ of the cylinder $37_a$ will thereby force piston $36_a$ downwardly axially, thereby assisting piston $36_c$ in rotating the crankshaft 34 through its first quadrant of counterclockwise rotation.

As the crankshaft 40 begins rotating through its second quadrant of rotation, the valve $69_d$ maintains alignment with the pasageway $77_d$. Pressurized fluid, therefore, continues to flow to the outer portion $71_a$ of the cylinder $37_a$ and the piston $36_a$ continues to transmit a downward force on the crankshaft 40. At this time, however, the valve $69_d$ has moved downwardly to an aligned position with passageway $77_b$. Pressurized fluid from the crankcase 40 will, therefore, be communicated through inlet passageway $41_b$ to passageway $77_b$ and hence through passageway $78_b$ to the outer portion $71_d$ of the cylinder $37_d$. Since valve $70_b$ has, at this time, moved downwardly in a non-aligned position relative to passageway $74_b$ the fluid is thereby prevented from flowing therethrough. Piston $36_d$ now transmits an axially inwardly force to the crankshaft 40, thereby assisting piston $36_a$ in rotating crankshaft 34 through its second quadrant of counterclockwise rotation.

As the crankshaft 34 begins rotation through its third quadrant, the valve $69_d$ has maintained continued alignment with passageway $77_b$ and the valve $69_c$ of the piston $36_c$ has now moved into alignment with passageway $77_c$, thereby communicating pressurized fluid from the crankcase 40 through the passageway $41_c$ and passageway $78_c$ to the outer portion $71_b$ of the cylinder $37_b$ thereby forcing piston $36_b$ axially upwardly to assist piston $36_d$ in rotating the crankshaft 34 through its third quadrant of counterclockwise rotation.

It will be understood that as the crankshaft begins rotation through its second quadrant, and the piston $36_c$ begins to move axially outwardly, the fluid in cylinder $37_c$ will tend to be driven through passageway $78_a$. At this point in the rotation of the crankshaft 39, however, valve $70_a$ of the piston $36_a$ has moved into alignment with passageway $74_a$. Since the valve $69_a$ is no longer in alignment with passageway $77_a$, the fluid in cylinder $37_c$ will be communicated through passageway $78_a$ to passage $77_a$, and thence through passageway $74_a$ to the outlet passageway $79_a$ (FIGURE 3).

As the crankshaft begins rotation through its fourth quadrant of counterclockwise rotation, valve $69_c$ has maintained alignment with passageway $77_c$ thereby communicating pressurized fluid from the crankcase 40 to the outer portion $71_b$ of the cylinder $37_b$ via the passageway $78_c$. At this time, however, valve $69_a$ has moved axially outwardly into alignment with passageway $77_a$, thereby communicating pressurized fluid to the outer portion $71_c$ of the cylinder $37_c$. The piston $36_c$ is thereby forced inwardly axially to assist piston $36_b$ in transmitting a rotative torque to the crankshaft 34 through its fourth quadrant of rotation. Also at this time, valve $70_d$ has moved ino alignment with passageway $74_d$ to permit fluid in the cylinder $37_a$ to flow outwardly through passageways $78_d$, $77_d$, $74_d$, and $79_d$ to the outlet port 23 connected thereto. Simultaneously, valve $70_b$ of piston $36_b$ has moved into alignment with passageway $74_b$, thereby permitting the fluid in the cylinder $37_d$ to flow through passageways $78_b$, $77_b$, $74_b$, and $79_b$ to an outlet port 23 connected thereto.

It will be understood that during rotation of the crankshaft 34 through each of its four quadrants of counterclockwise rotation, two adjacent cylinders are in fluid communication with the crankcase 40 and the other two cylinders are in fluid communication with their respective outlet ports 23. Therefore, as two pistons are transmitting a driving force to the crankshaft 34, the remaining two pistons are being driven outwardly by the crankshaft to discharge the fluid from their respective cylinders.

It will be noted that as each respective piston attains its top dead center position, only one cylinder is in fluid communication with the crankcase. As this occurs, however, the one piston which is transmitting rotative force to the crankshaft is at right angles to the offset of the crank 39 relative to the center line of the crankshaft 34. Therefore, at this moment, the one piston which is transmitting an axially inwardly directed force to the crankshaft produces the greatest effect of torque on the crankshaft available from one piston.

Referring to FIGURE 3, the check valves 22 comprise a compression spring 80 and a spherical valve check 81. It will be understood that the check valves 22 will prevent backward flow of fluid from the various points of use through the outlet passageways 79.

Referring to FIGURE 3, a threaded cover cap plug 82 is shown inserted into a complementarily threaded bore 83 in the outlet cover cap 13. Referring to FIGURE 6, an alternate embodiment of the outlet cover cap plug is shown at 84 which defines an axially extending aperture 86 concentrically aligned with the center line of the stub portion 44 of the crankshaft 34. A crankshaft extension 87 is rotatably housed within the aperture 86 and connected for joint rotation to the crankshaft stub portion 44 by means of a pin 88. The outer end 89 of the crankshaft extension 87 can be connected by any suitable means to an accessory attachment, such as an indicating device.

Thus, there has been provided a fluid flow control device for dividing and controlling the flow of pressurized fluid from a main source to a plurality of points of use which comprises a plurality of pistons mechanically linked together necessitating joint movement of all pistons to sustain operation of the device. Each piston must travel through a complete stroke, thereby assuring a predetermined full sweep of each cylinder per revolution of crankshaft travel. Hydraulic leakage past a piston is not critical since the timing of fluid flow to and from the other pistons will not be affected thereby. Hydraulic stall of the device is, therefore, precluded.

Since the valving means are integral with the pistons or sliding valves, the proper timing of the valves relative to the pistons is thus assured. The out-of-phase relation of the pistons relative to the angle of rotation of the crankshaft assures starting of the device regardless of the angular disposition of the crankshaft. The use of a plurality of yoke blocks to interconnect opposing pistons transforms liner piston movement into crankshaft rotation and vice versa with minimum side loading of the pistons. It is understood, of course, that more than two banks of cylinders can be used. Also, the same mechanical relationship between pistons and crankshaft in the present invention can be obtained in other ways, for example, by using four pistons in an "in line" arrangement with a four-crank crankshaft, the cranks being in 90° offset relation. Instead of yokes, conventional connecting rod means could be used for connecting the pistons to the crankshaft, especially if more than four pistons are used in odd numbers, thereby precluding opposite pairings of all pistons.

In the illustrated embodiment of the invention, the housing comprises four cylinders of equal size. It will be appreciated that cylinders of unequal size can be used within the principles of the present invention, and two or more outlets can be operatively coupled together to provide fewer outlets. Also contemplated within the principles of the present invention is the use of more than four cylinders and outlets, for example, by adding more cylinder banks in a single housing, or coupling two or more devices together for mutually simultaneous operation.

Therefore, although minor modifications might be suggested by those versed in the art, it should be understood that we wish to embody within the scope of the patent warranted hereon all such modifications as reasonably come within the scope of our contribution to the art.

We claim as our invention:

1. A flow control device comprising
 a housing having a crankshaft journalled for rotation therewithin;
 a fluid inlet in said housing adapted to be connected to a source of pressurized fluid;
 a plurality of fluid outlets in said housing adapted to be connected to a plurality of points of use; and
 a plurality of jointly movable reciprocable pistons carried within said housing and operatively connected to said crankshaft;
  said pistons adapted to be successively, alternately in fluid-driven communication with said inlet and in fluid-expelling communication with said outlets, the directions of reciprocable movement of said pistons being at right angles to the axis of rotation of said crankshaft.

2. A flow control device comprising
 a housing having a crankshaft journalled for rotation therewithin;
 a fluid inlet in said housing adapted to be connected to a source of pressurized fluid;
 a plurality of fluid outlets in said housing adapted to be connected to a plurality of points of use; and
 a plurality of jointly movable reciprocable pistons carried within said housing and operatively connected to said crankshaft;
  said pistons adapted to be successively, intermittently in fluid communication with said inlet to be driven by the pressurized fluid and, alternately to said communication, in fluid communication with said outlets to discharge a flow of fluid to the points of use, said pistons further being arranged in mutually equal angularly spaced relation around the axis of rotation of said crankshaft.

3. A flow control device comprising
 a housing having a crankshaft journalled for rotation therewithin;
 a fluid inlet in said housing adapted to be connected to a source of pressurized fluid;
 a plurality of fluid outlets in said housing adapted to be connected to a plurality of points of use,
 a plurality of reciprocable slide valve assemblies within said housing, and yoke blocks interconnecting said slide valve assemblies and said crankshaft for providing joint movement of said slide valve assemblies and for translating linear movement of said slide valve assemblies into rotational movement of said crankshaft with minimum side loading of said slide valve assemblies,
  said assemblies adapted to be successively in fluid-driven communication with said inlet and in fluid-expelling communication with said outlets.

4. In a flow control device for metering fluids from a fluid source to a plurality of points of use
 a housing;
 means defining an inlet in said housing adapted for connection to a source of pressurized fluid;
 means defining a plurality of outlets in said housing adapted for connection to a plurality of points of use;
 a plurality of jointly movable slide valve assemblies carried within said housing and arranged to provide mutually out of phase movement relative to each other;
  said assemblies adapted to be successively intermittently in fluid communication with said inlet means to be driven by a predetermined volume of the pressurized fluid, and in fluid communication with said outlets to discharge said volume of fluid through said outlets to the points of use,
 whereby the fluid from the source is metered in predetermined volumes to the points of use.

5. A flow control device comprising
 a housing;
 a fluid inlet in said housing adapted to be connected to a source of pressurized fluid;
 a plurality of fluid outlets in said housing adapted to be connected to a plurality of points of use;
 a plurality of jointly movable reciprocable pistons carried in said housing and arranged for mutually out-of-phase movement relative to each other; and
 valve means defined by said pistons and arranged to provide successively, alternately fluid-driven communication between said pistons and said inlet and fluid-expelling communication between said pistons and said outlets.

6. In a flow control device for metering fluids from a fluid source to a plurality of points of use a housing having means defining a crankcase disposed therein;

means defining an inlet in said housing for connecting said crankcase means to a source of pressurized fluid, means defining a plurality of outlets in said housing for connection to a plurality of points of use;

a crankshaft mounted within said housing and disposed for rotation within said crankcase means;

a plurality of piston means slidably carried within said housing and operatively connected to said crankshaft in mutually out-of-phase relation; and a plurality of valve means defined by said piston means and disposed to provide successively, alternately fluid-driven communication between said pistons and said crankcase and fluid-discharging communication between said pistons and said outlets.

7. In a flow control device for metering fluids from a fluid source to a plurality of points of use;

a housing having means defining a crankcase disposed therein, means defining an inlet in said housing for connecting said crankcase means to a source of pressurized fluid;

means defining a plurality of outlets in said housing for connection to a plurality of points of use;

a crankshaft mounted within said housing and disposed for rotation within said crankcase means;

a plurality of slide valves carried within said housing and operatively connected to said crankshaft in mutually out-of-phase relation; and a plurality of valve means defined by said slide valves and disposed to provide successively, alternately fluid-driven communication between said slide valves and said crankcase means and fluid-discharging communication between said slide valves and said outlet means.

8. In a flow control device for metering fluids from a fluid source to a plurality of points of use;

a housing having means defining a crankcase disposed therein;

means defining an inlet in said housing for connecting said crankcase means to a source of pressurized fluid; means defining a plurality of outlets in said housing arranged for communication with said crankcase means and adapted for connection to a plurality of points of use; and slide valve means reciprocably carried within said housing and operatively connected to said crankshaft in mutually out-of-phase relation to alternatively, successively connect said crankcase means and said outlet means in fluid-expelling communication and said slide valve means and said crankcase means in fluid-driven communication.

9. A fluid flow control device for metering fluids from a fluid source to a plurality of points of use comprising, a housing having means defining a crankcase disposed therein;

means defining an inlet in said housing for connecting said housing to a source of pressurized fluid; means defining a plurality of outlets in said housing for connection to a plurality of points of use; a crankshaft mounted within said housing and disposed for rotation within said crankcase means; means defining a plurality of cylinders in said housing in open communication with said crankcase means;

a plurality of silde valve assemblies slidably carried within said cylinders and operatively connected to said crankshaft;

a plurality of fluid communicating means connecting said cylinders and said outlets; and a plurality of valve means defined by said slide valve assemblies and arranged to successively, alternately provide fluid communication from said crankcase to said cylinders for driving said slide valve assemblies, and from said cylinders to said outlet for discharging the fluid to the points of use.

10. In a fluid flow control device, a housing having means defining a crankcase disposed therein;

a crankshaft mounted in said housing to rotate in said crankcase;

means defining a plurality of cylinders in said housing extending outwardly and spaced axially relative to said crankshaft;

a plurality of pistons slidably carried in said cylinders and operatively connected to said crankshaft;

means defining an inlet in said housing for connecting said crankcase to a source of pressurized fluid;

means defining a plurality of outlets in said housing in communication with said cylinders; and valve means defined by said pistons and arranged to provide successively, alternately fluid-driven communication between said crankcase and said cylinders and between said cylinders and said outlets.

11. In a fluid flow control device, a housing having means defining a crankcase disposed therein;

a crankshaft mounted within said housing and disposed to rotate within said crankcase;

means defining an inlet in said housing for connecting said crankcase to a source of pressurized fluid;

means defining a plurality of outlets in said housing for connecting to a plurality of points of use;

means defining a plurality of cylinders in said housing arranged in banks spaced axially with respect to said crankshaft and connected to said outlets;

a plurality of pistons slidably carried in said cylinders and operatively connected to said chankshaft; and valve means connected to said crankshaft and arranged to provide successively, alternately fluid-driven communication between said crankcase and said cylinders and between said cylinders and said outlets.

12. In a fluid flow control device, a housing having means defining a crankcase disposed therein;

a crankshaft mounted within said housing and disposed to rotate within said crankcase;

means defining an inlet in said housing for connecting said crankcase to a source of pressurized fluid;

means defiining a plurality of outlets in said housing for connecting to a plurality of points of use;

means defining plurality of cylinder banks in said housing spaced axially relative to said crankshaft and comprising a plurality of opposed cylinders extending radially from said crankshaft;

means communicating said cylinders and said outlets;

a plurality of pistons slidably carried in said cylinders and operatively connected to said crankshaft; and valve means connected to said crankshft and arranged to provide successively, alternately fluid-driven communication between said crankcase and said cylinders and between said cylinders and said outlets.

13. In a fluid control device, a housing having means defining a crankcase disposed therein;

a crankshaft mounted within said housing and disposed to rotate within said crankcase;

means defining an inlet in said housing for connecting said crankcase to a source of pressurized fluid;

means defining a plurality of outlets in said housing for connecting to a plurality of points of use;

means defining a plurality of cylinder banks in said housing spaced axially relative said crankshaft and comprising a pair of mutually opposed in-line cylinders extending radially from said crankshaft;

means communicating said cylinders and said outlets;

a plurality of pistons carried in said cylinders and arranged in mutually out-of-phase relation;

means connecting said pistons and said crankshaft;

valve means defined by said pistons and arranged to provide successively, alternately fluid-driven communication between said crankcase and said cylinders to communicate predetermined volumes of fluid to said cylinders and fluid-expelling communication between said cylinders and said outlets for communicating the volumes to the points of use connected to said outlets.

14. In a fluid flow control device,
a housing having means defining a crankcase disposed therein,
a crankshaft mounted within said housing and disposed to rotate within said crankcase,
means defining an inlet in said housing for connecting said crankcase to a source of pressurized fluid;
means defining a plurality of outlets in said housing for connecting to a plurality of points of use;
means defining a plurality of cylinder banks in said housing spaced axially relative to said crankshaft and comprising a pair of mutually opposed in line cylinders extending radially from said crankshaft, said banks being arranged in mutually angularly offset relation with respect to the normal of the axis of said crankshaft;
a plurality of pistons carried in said cylinders and arranged in mutually out-of-phase relation;
means connecting said piston and said crankshaft;
valve means defined by said pistons and arranged to provide successively, alternately fluid-driven communication between said crankcase and said cylinders to communicate predetermined volumes of fluid to said cylinders and fluid-expelling communication between said cylinders and said outlets for communicating the volumes to the points of use connected to said outlets.

15. In a fluid flow control device,
a housing having means defining a crankcase disposed therein;
a crankshaft mounted within said housing and disposed to rotate within said crankcase;
means defining an inlet in said housing for connecting said crankcase to a source of pressurized fluid;
means defining a plurality of outlets in said housing for connecting to a plurality of points of use;
means defining a plurality of cylinder banks in said housing spaced axially relative to said crankshaft and comprising a pair of mutually opposed in-line cylinders extending radially from said crankshaft;
said banks being disposed in substantially 90° mutual offset relation with respect to the normal of the axis of said crankshaft;
means communicating said cylinders to said outlets;
a plurality of pistons carried in said cylinders and arranged in mutually out-of-phase relation;
means connecting said mutually opposed pistons to said crankshaft; and
valve means defined by said pistons and arranged to provide successively, alternately fluid-driven communication between said crankcase and said cylinders to communicate predetermined volumes of fluid to said cylinders and fluid-expelling communication between said cylinders and said outlets for communicating the volumes to the points of use connected to said outlets.

16. In a fluid flow control device,
a housing having means defining a crankcase disposed therein;
a crankshaft mounted within said housing and disposed to rotate within said crankcase;
means defining an inlet in said housing for connecting said crankcase to a source of pressurized fluid;
means defining a plurality of outlets in said housing for connecting to a plurality of points of use;
means defining a plurality of cylinder banks in said housing spaced axially relative to said crankshaft and comprising a pair of mutually opposed in-line cylinders extending radially from said crankshaft;
said banks being disposed in substantially 90° mutual offset relation with respect to the normal of the axis of said crankshaft;
yoke means defining driving slots disposed in substantially 90° mutual offset relation with respect to the normal of the axis of said crankshaft interconnecting said mutually opposed pistons to said crankshaft to effect simultaneous movement of said mutually opposed cylinders; and
valve means defined by said pistons and arranged to provide successively, alternately fluid-driven communication between said crankcase and said cylinders to communicate predetermined volumes of fluid to said cylinders and fluid-expelling communication between said cylinders and said outlets for communicating the volumes to the points of use connected to said outlets.

17. In a fluid flow control device,
a housing having means defining a crankcase therein;
means defining an inlet in said housing for connecting said crankcase to a source of pressurized fluid;
means defining a plurality of outlets in said housing for connecting to points of use;
means defining a plurality of cylinder banks arranged perpendicularly and spaced axially relative to said crankshaft and comprising a pair of mutually opposed cylinders angularly offset 90° relative to said opposed cylinders of the adjoining bank;
a plurality of pistons respectively slidably carried in said cylinders and shaped complementarily thereto;
valve means defined by said pistons for successively, alternately connecting said crankcase and said cylinders in 90° out of phase fluid-driven communication and said cylinders and said outlets in 90° out-of-phase fluid-expelling communication; and
yoke means interconnecting said opposed pistons to said crankshaft to effect joint movement of said pistons and defining longitudinal driving slots disposed therein for receiving said crankshaft,
said driving slots being arranged in substantially 90° mutual offset relation to provide full stroke movement of said pistons for each revolution of said crankshaft,
whereby at all angles of rotation of said crankshaft at least one cylinder is arranged in fluid-driven communication with said crankcase and said pistons are arranged for full stroke movement for each revolution of said crankshaft.

18. A fluid flow control device comprising,
a housing having means defining a crankcase;
means defining an inlet in said housing for connecting said crankcase to a source of pressurized fluid;
a crankshaft rotatably mounted in said housing;
means defining a plurality of spaced cylinders in said housing having an inner portion, an outer portion and a middle portion;
a plurality of pistons carried respectively within said cylinders and operatively connected to said crankshaft in mutually out-of-phase relation;
means defining a plurality of outlets in said housing for connecting to points of use and for communicating respectively with said middle portions of said cylinders;
first passageway means for communicating said outer portions of said cylinders with said inner portions and said middle portions of that one of said cylinders which is disposed in one direction thereto;
second passageway means for communicating said crankcase with said inner portions of said cylinders;
first valve means connected to said crankshaft for successively communicating said second passageway means with said inner portions of said cylinders; and second valve means connected to said crankshaft, in out-of-phase relation to said first valve means, for successively communicating said first passageway means with said outlets.

19. A fluid flow control device comprising
a housing having means defining a crankcase;
means defining an inlet in said housing for connecting said crankcase to a source of pressurized fluid;
a crankshaft rotatably mounted in said housing;
means defining a plurality of spaced cylinders in said housing extending radially outwardly from and disposed circumferentially around said crankshaft and having an inner portion, an outer portion and a middle portion;
a plurality of pistons carried respectively within said cylinders and connected to said crankshaft in mutually out-of-phase relation;
means defining a plurality of outlets in said housing for connecting to points of use and for communicating respectively with said middle portions of said cylinders;
a plurality of first passageway means defined by said housing for communicating said outer portions of said cylinders with said inner portions and said middle portions of that one cylinder which is disposed circumferentially adjacent thereto in one direction therefrom;
a plurality of second passageway means defined by said housing for communicating said crankcase with said inner portions of said cylinders,
a plurality of first valve means defined by said pistons for successively communicating said second passageway means with said inner portions of said cylinders; and
a plurality of second valve means defined by said pistons for successively communicating, in out-of-phase relation to said first valve means, said first passageway means with said outlets.

References Cited

UNITED STATES PATENTS

| | | | |
|---|---|---|---|
| 2,243,978 | 6/1941 | Reader | 103—49 |
| 2,862,449 | 12/1958 | Wylard | 103—49 |
| 3,188,963 | 6/1965 | Tyler | 103—49 X |

ROBERT M. WALKER, *Primary Examiner.*